(12) United States Patent
Thiriet et al.

(10) Patent No.: US 12,421,902 B2
(45) Date of Patent: Sep. 23, 2025

(54) TRANSFER OF POWER BETWEEN THE HIGH-PRESSURE SHAFT AND THE LOW-PRESSURE SHAFT OF A TURBOMACHINE

(71) Applicant: SAFRAN HELICOPTER ENGINES, Bordes (FR)

(72) Inventors: Romain Jean Gilbert Thiriet, Moissy-Cramayel (FR); David Bernard Martin Lemay, Moissy-Cramayel (FR); Fabien Mercier-Calvairac, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/291,558

(22) PCT Filed: Jul. 22, 2022

(86) PCT No.: PCT/FR2022/051469
§ 371 (c)(1),
(2) Date: Jan. 23, 2024

(87) PCT Pub. No.: WO2023/007076
PCT Pub. Date: Feb. 2, 2023

(65) Prior Publication Data
US 2025/0092833 A1    Mar. 20, 2025

(30) Foreign Application Priority Data
Jul. 29, 2021 (FR) ........................ 2108280
Jul. 29, 2021 (FR) ........................ 2108281

(51) Int. Cl.
*F02C 7/36* (2006.01)
*F02C 9/28* (2006.01)
*F02C 9/56* (2006.01)

(52) U.S. Cl.
CPC .................. *F02C 7/36* (2013.01); *F02C 9/28* (2013.01); *F02C 9/56* (2013.01);
(Continued)

(58) Field of Classification Search
CPC .... F02C 3/113; F02C 7/36; F02C 9/28; F02C 9/56; F05D 2260/82; F05D 2260/821; F05D 2260/94; F05D 2260/941; F05D 2270/332
See application file for complete search history.

(56) References Cited

U.S. PATENT DOCUMENTS 7,181,959 B2 *  2/2007  Matsumoto ............. F02B 39/16
                                                73/114.01
7,285,871 B2 * 10/2007  Derouineau ............. F02C 9/26
                                                290/52

(Continued)

OTHER PUBLICATIONS

International Search Report received for PCT Patent Application No. PCT/FR2022/051469, mailed on Nov. 30, 2022, 5 pages (2 pages of English Translation and 3 pages of Original Document).

*Primary Examiner* — Alain Chau
(74) *Attorney, Agent, or Firm* — WOMBLE BOND DICKINSON (US) LLP (57) ABSTRACT

A device for controlling a power-transfer system for the transfer of power between a high-pressure shaft and a low-pressure shaft of a turbomachine of an aircraft, including a fatigue analysis module analysing the fatigue of the turboma-chine and designed to determine, from between two indicators (D1, D2) respectively measuring two fatigues of the turbomachine, which is the one that is the most advanced, which is to say which is the one at risk of being first to reach a respective upper limit (D1max, D2max); and—a control module controlling the power transfer system and designed to slow the fatigue measured by the more advanced indicator (D1, D2).

14 Claims, 8 Drawing Sheets

(52) U.S. Cl.
CPC .. *F05D 2220/323* (2013.01); *F05D 2260/821* (2013.01); *F05D 2260/941* (2013.01); *F05D 2270/112* (2013.01); *F05D 2270/114* (2013.01); *F05D 2270/303* (2013.01); *F05D 2270/304* (2013.01); *F05D 2270/332* (2013.01)

(56) References Cited

U.S. PATENT DOCUMENTS

| | | | |
|---|---|---|---|
| 7,454,297 B2 * | 11/2008 | Balestra | G07C 5/0841 702/42 |
| 9,285,292 B2 * | 3/2016 | Evrard | G01M 15/14 |
| 9,346,553 B2 * | 5/2016 | Gaulmin | F02C 9/42 |
| 9,494,086 B2 * | 11/2016 | Pandey | F01K 5/02 |
| 9,593,591 B2 * | 3/2017 | Phillips | G07C 5/0808 |
| 10,006,375 B1 * | 6/2018 | Wagner | B64D 27/35 |
| 10,316,689 B2 * | 6/2019 | Fletcher | F04D 29/053 |
| 11,149,582 B2 * | 10/2021 | Shenouda | F01D 17/08 |
| 11,521,430 B2 * | 12/2022 | Tran | G08B 21/182 |
| 2005/0274112 A1 * | 12/2005 | Matsumoto | F02B 39/16 60/602 |
| 2006/0225431 A1 | 10/2006 | Kupratis | |
| 2008/0275597 A1 * | 11/2008 | Gaulmin | F02C 9/28 701/100 |
| 2013/0199204 A1 * | 8/2013 | Camhi | G05B 23/0221 60/779 |
| 2013/0204468 A1 * | 8/2013 | Camhi | G07C 5/0816 701/100 |
| 2014/0052410 A1 * | 2/2014 | Tralshawala | F01D 17/04 702/183 |
| 2014/0200844 A1 * | 7/2014 | Evrard | G01M 15/14 702/130 |
| 2015/0247464 A1 * | 9/2015 | Pandey | F01K 5/02 700/288 |
| 2015/0369138 A1 | 12/2015 | Phillips et al. | |
| 2018/0051587 A1 * | 2/2018 | Fletcher | F04D 25/045 |
| 2018/0371922 A1 * | 12/2018 | Sitkiewicz | F01D 5/28 |
| 2020/0056549 A1 | 2/2020 | Terwilliger et al. | |
| 2020/0066061 A1 * | 2/2020 | Tran | F02C 7/00 |
| 2020/0392910 A1 * | 12/2020 | Whatley | F02C 9/48 |
| 2021/0047969 A1 * | 2/2021 | Terwilliger | F02C 6/00 |
| 2021/0115808 A1 * | 4/2021 | Shenouda | F01D 21/003 |

* cited by examiner

TRANSFER OF POWER BETWEEN THE HIGH-PRESSURE SHAFT AND THE LOW-PRESSURE SHAFT OF A TURBOMACHINE

TECHNICAL FIELD OF THE INVENTION

The present invention relates to a control device for controlling a power transfer system for transferring the power between a high-pressure shaft and a low-pressure shaft of a turbomachine of an aircraft, a propulsion system for an aircraft comprising such a control device and an aircraft comprising such a propulsion system. The invention also relates to a method for controlling a power transfer system for transferring power between a high-pressure shaft and a low-pressure shaft of a turbomachine of an aircraft, and to a corresponding computer program.

TECHNOLOGICAL BACKGROUND

It is known to calculate fatigue indicators for a turbomachine. When one of these indicators reaches a respective threshold, the turbomachine must be serviced.

However, this type of maintenance operation immobilizes the apparatus and is very costly.

It may therefore be desirable to extend the time interval between two maintenance operations on the turbomachine.

In addition, the document US 2015/369138 A1 concerns the power transfer between the high-pressure shaft and the low-pressure shaft of the turbomachine.

SUMMARY OF THE INVENTION

A control device is therefore proposed for controlling a power transfer system for transferring power between a high-pressure shaft and a low-pressure shaft of a turbomachine of an aircraft, characterised in that it comprises:
  a fatigue analysis module for analysing the fatigue of the turbomachine designed to determine which of two indicators measuring two respective fatigues of the turbomachine is the most advanced, i.e. is likely to reach a respective upper limit first; and
  a control module for controlling the power transfer system designed to slow down the fatigue measured by the most advanced indicator.

The thresholds are generally calculated for an average, statistically observed turbomachine use. However, each fatigue evolves more or less quickly depending on how the turbomachine is used, which in practice does not necessarily correspond to the average use used to set the thresholds. Thanks to the invention, the actual use of the turbomachine is taken into account and the power transfer between the high-pressure shaft and the low-pressure shaft allows to slow down the wear that predominates in this actual use, and thus to space out the maintenance operations on the turbomachine.

The invention may also comprise one or more of the following optional characteristics, in any technically possible combination.

Optionally, one of the two fatigues is a low cycle fatigue of a high pressure compressor mounted on the high pressure shaft and/or of a high pressure turbine mounted on the high pressure shaft.

Also optionally, the low cycle fatigue indicator is calculated from the speed of rotation of the high pressure shaft.

Also optionally, one of the two fatigues is a creep fatigue of the vanes of a high-pressure turbine mounted on the high-pressure shaft.

Also optionally, the indicator of the creep fatigue is calculated from a gas outlet temperature at the outlet of the high-pressure turbine.

Also optionally, the control device also comprises a regulation module for regulating the output power of the turbomachine, independently of the control of the power transfer system.

Also optionally, the control device further comprises, the two indicators increasing with respectively two operating parameters of the turbomachine, a turbomachine operating analysis module designed to detect when an operating upper limit is reached by the parameter associated with the most advanced indicator, and the control module for controlling the power transfer system is further designed, in response to the detection of the operating upper limit being reached, to control the power transfer system by maintaining the parameter associated with the most advanced indicator at that operating upper limit while allowing the other parameter to increase, so as to increase a power output margin of the turbomachine.

Optionally, the parameter on which the indicator of the low cycle fatigue depends is a speed of rotation of the high-pressure shaft.

Optionally, the parameter on which the indicator of the creep fatigue depends is a gas outlet temperature at the high-pressure turbine outlet.

A propulsion system for an aircraft is also proposed, characterised in that it comprises:
  a turbomachine comprising:
    a high-pressure shaft,
    a high-pressure compressor mounted on the high-pressure shaft,
    a high-pressure turbine mounted on the high-pressure shaft and designed to be passed through by gases,
    a low-pressure shaft, and
    a low-pressure turbine mounted on the low-pressure shaft and designed to be passed through by the gases that have passed through the high-pressure turbine;
  a power transfer system for transferring power between the high-pressure shaft and the low-pressure shaft; and
  a control device for controlling the power transfer system according to the invention.

An aircraft comprising a propulsion system according to the invention is also proposed.

A method for controlling a power transfer system for transferring power between a high-pressure shaft and a low-pressure shaft of a turbomachine of an aircraft is also proposed, characterised in that it comprises:
  determining which of two indicators measuring two different fatigues of the turbomachine is the most in advance, i.e. is likely to reach a respective upper limit first; and
  controlling the power transfer system to slow down the fatigue measured by the most advanced indicator.

Optionally, the control for controlling the power transfer system to slow down the fatigue measured by the most advanced indicator is carried out in a first mode, the method further comprising switching to a second mode comprising, with the two indicators increasing with respectively two operating parameters of the turbomachine, detecting that the parameter associated with the most advanced indicator first reaches a respective upper limit, and, in response to the detection, controlling the power transfer system in order to maintain the most advanced indicator parameter at its upper limit and to increase the other parameter, so as to increase a power output margin of the turbomachine.

Also proposed is a computer program that can be downloaded from a communication network and/or recorded on a computer-readable medium, characterised in that it comprises instructions for executing the steps of a method according to the invention, when said computer program is executed on a computer.

BRIEF DESCRIPTION OF THE FIGURES

The invention will be better understood with the aid of the following description, given only by way of example and made with reference to the attached drawings in which.

DETAILED DESCRIPTION OF THE INVENTION

Figure 1:
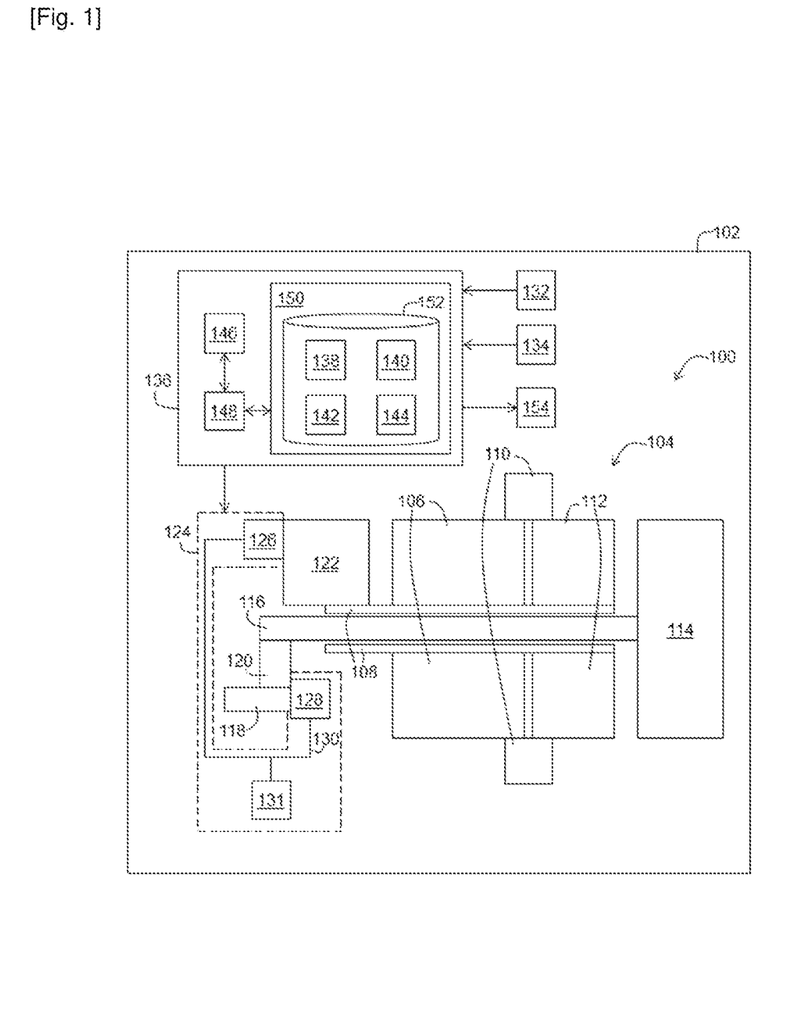
FIG. 1 is a schematic view of an aircraft and in particular of a turbomachine of this aircraft.

With reference to FIG. 1, an example of a propulsion system 100 according to the invention will now be described. This propulsion system 100 is equipped to an aircraft 102, such as a helicopter.

The propulsion system 100 firstly comprises a turbomachine 104, such as a turboshaft engine, particularly in the case of a helicopter. Alternatively, the turbomachine could be a turbojet or a turboprop.

The turbomachine 104 first comprises a high-pressure compressor 106 designed to provide air at high pressure.

The turbomachine 104 also comprises a high-pressure shaft 108 on which the high-pressure compressor 106 is mounted so as to be driven by the high-pressure shaft 108. During operation of the turbomachine 104, the high-pressure shaft 108 has a speed of rotation, noted NHP.

The turbomachine 104 further comprises a combustion chamber 110 designed to carry out a combustion between a fuel and the high-pressure air provided by the high-pressure compressor 106, to provide high-speed exhaust gases.

The turbomachine 104 also comprises a high-pressure turbine 112 designed to be passed through by the exhaust gases in order to be driven in rotation. The high-pressure turbine 112 is mounted on the high-pressure shaft 108 so as to drive the latter in rotation.

When the turbomachine 104 is operating, the exhaust gases have an outlet temperature, referred to as T45, at the outlet of the high-pressure turbine 112.

The turbomachine 104 also comprises a low-pressure turbine 114 (also referred to as a "free turbine") designed to be passed through by the exhaust gases that have previously passed through the high-pressure turbine 112.

The turbomachine 104 also comprises a low-pressure shaft 116 on which the low-pressure turbine 114 is mounted in order to drive the low-pressure shaft 116 in rotation.

The turbomachine 104 also comprises an output shaft 118 connected to the low-pressure shaft 116, for example via an output gear 120. When the aircraft 102 is a helicopter, the output shaft 118 drives in particular blades of the helicopter, generally via a main gearbox (MGB).

The turbomachine 104 also comprises a gear system 122, generally referred to as an "accessory gearbox", connected to the high-pressure shaft 108.

The turbomachine 104 is designed to provide a maximum power Pn, which can vary depending on the regime of the turbomachine 104. The turbomachine 104 can, for example, operate according to one or more of the following regimes: maximum continuous power (MCP), maximum take-off power (MTP), with one engine inoperative in cruise for a twin-engine aircraft (OEIC), with one engine inoperative during two minutes for a twin-engine aircraft (OEI2'). This maximum power Pn is reached when the rotation speed NHP reaches an upper limit NHPmax or when the output temperature T45 reaches an upper limit T45max, for example depending on ambient conditions, such as ambient temperature T0 and ambient pressure P0. In hot weather, for example, it is the output temperature T45 that can limit the maximum power Pn, while in cold weather it may be the speed of rotation NHP.

The upper limit NHPmax of the speed of rotation NHP corresponds, in the example described, to the maximum speed of rotation of the high-pressure shaft 108. The upper limit T45max of the output temperature T45 corresponds, for example, to the maximum output temperature. These upper limits may vary depending on the regime of the turbomachine 104.

The propulsion system 100 also comprises a power transfer system 124, designed in particular to transfer power between the high-pressure shaft 108 and the low-pressure shaft 116.

In the example described, the power transfer system 124 firstly comprises a high pressure electric machine 126 connected to the high pressure shaft 108, for example via the gear system 122. The power transfer system 124 further comprises a low pressure electric machine 128 connected to the low pressure shaft 116, for example via the output shaft 118 and the output gear 120. The power transfer system 124 also comprises an electrical connection 130 linking the high-pressure 126 and low-pressure 128 electric machines. Each of the latter is designed to operate selectively as a motor and a generator. Thus, when the high-pressure electric machine 126 operates as a generator while the low-pressure electric machine 128 operates as a motor, power is transferred from the high-pressure shaft 108 towards the low-pressure shaft 116. Conversely, when the low-pressure electric machine 128 operates as a generator while the high-pressure electric machine 126 operates as a motor, power is transferred from the low-pressure shaft 116 towards the high-pressure shaft 108.

The power transfer system 124 may also comprise an energy storage device 131, for example including one or more batteries. The power transfer system is thus further designed to transfer power between the energy storage device 131 and each of the high-pressure 108 and low-pressure 116 shafts. For example, the energy storage device 131 is designed to store electrical energy and is connected to the electric machines 126, 128, for example via the electrical connection 130. The presence of such an electrical energy storage device remains optional, however, as the transfer of power between the high-pressure shaft 108 and the low-pressure shaft 116 can be performed without requiring energy input from a storage device.

Alternatively, the power transfer system 124 could connect the high-pressure 108 and low-pressure 116 shafts mechanically and/or hydraulically, without the need for electric machines.

Certain parts of the high-pressure compressor 106 and/or of the turbine 114 are subjected to repeated stresses, leading to low cycle fatigue of these parts. In particular, this low cycle fatigue results from cyclic variations in the rotational speed NHP of the high-pressure shaft 108. To assess this low cycle fatigue, the propulsion system 100 also comprises a counter 132 for an indicator D1 of this low cycle fatigue. In particular, the counter 132 is designed to calculate the indicator D1 from the rotational speed NHP, for example by calculating a number of cycles of the rotational speed NHP. For example, the counter 132 implements a rainflow counting algorithm.

In addition, the high-pressure turbine 112 comprises vanes that receive the exhaust gases leaving the high-pressure compressor 106. The exhaust gases are therefore very hot. Under the effect of continuous hot loads, the vanes tend to deform, particularly as a result of centrifugal force. This means that the vanes are susceptible to be subjected to a creep fatigue. To evaluate this creep fatigue for the vanes, the propulsion system 100 also comprises a counter 134 for an indicator D2 of this creep fatigue. In particular, the counter 134 is designed to calculate the indicator D2 from the output temperature T45. In some embodiments, it can be designed to calculate the indicator D2 additionally from the rotation speed NHP. The latter may play a role in the creep fatigue, but to a lesser extent than the outlet temperature T45. For example, the indicator D2 is incremented every time step by the following value: indicator_D2_increment=constant×f(T45)×g(NHP)× time_step_length, with the f function giving higher values than the function g for the possible values of T45 and NHP. The consecutive time steps, for example, are of constant duration.

Respective thresholds D1max, D2max of the indicators D1, D2 are recorded in the counters 132, 134 respectively and each of the latter is designed to detect when its respective threshold D1max, D2max is reached, and to issue an alert in response, indicating that a maintenance operation on the turbomachine 104 needs to be carried out.

In other words, when one of the indicators 132, 134 reaches its respective threshold D1max, D2max, this means that the actual service life has reached a predetermined minimum value as an alert for the need for maintenance.

The propulsion system 100 also comprises a control device 136 designed in particular to control the turbomachine 104 and the power transfer system 124. The control device 136 comprises, for example, an Electronic Engine Control Unit (EECU).

The control device 136 comprises in particular: a control module 138 for controlling the turbomachine 104, a control module 140 for controlling the power transfer system 124, an analysis module 142 for analysing the fatigue of the turbomachine 104, and an analysis module 144 for analysing the operation of the turbomachine 104.

The control device 136 may, for example, be a computer system comprising a data processing unit 146 (such as a microprocessor) and a main memory 148 (such as a Random Access Memory-RAM) accessible by the data processing unit 146. The computer system also comprises, for example, a network interface and/or a computer-readable medium 150, such as a local medium (such as a local hard disk) or a remote medium (such as a remote hard disk accessible via the network interface through a communications network). A computer program 152 containing instructions for the data processing unit 146 is stored on the medium 150 and/or can be downloaded via the network interface. This computer program 152 is intended to be loaded into the main memory 148, so that the data processing unit 146 can execute its instructions for implementing the modules 138, 140, 142, 144 of the control device 136, which are then software modules.

Alternatively, all or some of these modules 138, 140, 142, 144 could be carried out by hardware modules, i.e., in the form of electronic circuits, for example micro-wired, not involving a computer program.

The control device 136 is designed to operate in different operating modes. In the example described, these operating modes comprise at least some of the following operating modes: OFF, GROUND IDLE, REDUCED EMISSIONS, MAX SERVICE LIFE, MAX POWER and AUTO.

To allow one of these modes to be selected, the propulsion system 100 comprises, for example, a man/machine interface 154, which can preferably be used by a driver of the aircraft.

The OFF and GROUND IDLE modes can be activated in particular when the aircraft 102 is on the ground. The AUTO, REDUCED EMISSIONS, MAX SERVICE LIFR and MAX POWER modes are flight modes that can be activated when the aircraft is in flight.

For a helicopter, in each of the flight modes, the control module 138 for controlling the turbomachine 104 is designed to regulate the speed of the output shaft 118 at a constant speed, for example by controlling a fuel injection flow rate into the combustion chamber 110. Depending on the inclination of the blades of the helicopter, this regulation may require the turbomachine 104 to provide more or less power. In this way, the turbomachine 104 provides an output power (power of the output shaft 118, also referred to as net power) which is indirectly modified by the control module 138 for controlling the turbomachine 104.

The net power is thus equal to the power at the level of the low-pressure shaft 116 (gross power)+the power exchanged between the high-pressure shaft 118 and the low-pressure shaft 116 (possibly with an efficiency factor). This exchanged power is positive for an exchange from the high-pressure shaft 118 towards the low-pressure shaft 116, or negative for an exchange from the low-pressure shaft 116 towards the high-pressure shaft 118.

OFF Mode

In this operating mode, the control module 138 for controlling the turbomachine 104 keeps the latter switched off.

In addition, the control module 140 for controlling the power transfer system 124 controls the latter so that no power transfer occurs between the electric machines 126, 128, or between the energy storage device 131 and each of the electric machines 126, 128.

GROUND IDLE Mode

In this operating mode, the control module 138 controlling the turbomachine 104 starts the latter and stabilises the speed of the output shaft 118 at a ground idle speed, for example 75% of a nominal speed.

For start-up, the control module 140 controlling the power transfer system 124, for example, controls the latter so that the energy storage device 131 provides power to the high-pressure shaft 108, via the high-pressure machine 126 in the example described.

Once the turbomachine 104 has started up and the speed of the output shaft 118 has stabilised, the control module 140 of the power transfer system 124 controls the latter, for example, to transfer power from the high-pressure shaft 108 and/or from the low-pressure shaft 116 towards the energy storage device 131 in order to recharge the latter.

REDUCED EMISSIONS Mode

In this mode, the aim is to limit CO2 and NOX emissions from the turbomachine 104, as well as the noise pollution caused by the latter.

The control module 140 controlling the power transfer system 124 controls the latter so that the energy storage device 131 provides power to the low-pressure shaft 116. For example, the energy storage device 131 is controlled to provide the maximum possible power.

At the same time, the control module 140 controlling the power transfer system 124 compares a charge level of the energy storage device 131 with a predefined lower limit. When this lower limit is reached, the module 140 switches the control device 136 to one of the MAX SERVICE LIFE, MAX POWER and AUTO modes, preferably to AUTO mode. Switching from REDUCED EMISSIONS mode towards another mode can take place depending on conditions other than the charge level of the energy storage device 131, for example when the flight speed is greater than 80 kts and/or when the height above ground is greater than 1,000 feet.

MAX SERVICE LIFE Mode

In this mode, the aim is to lengthen the period between two maintenance operations on the turbomachine 104, without impacting the power that can be provided by the turbomachine 104.

Figure 2:
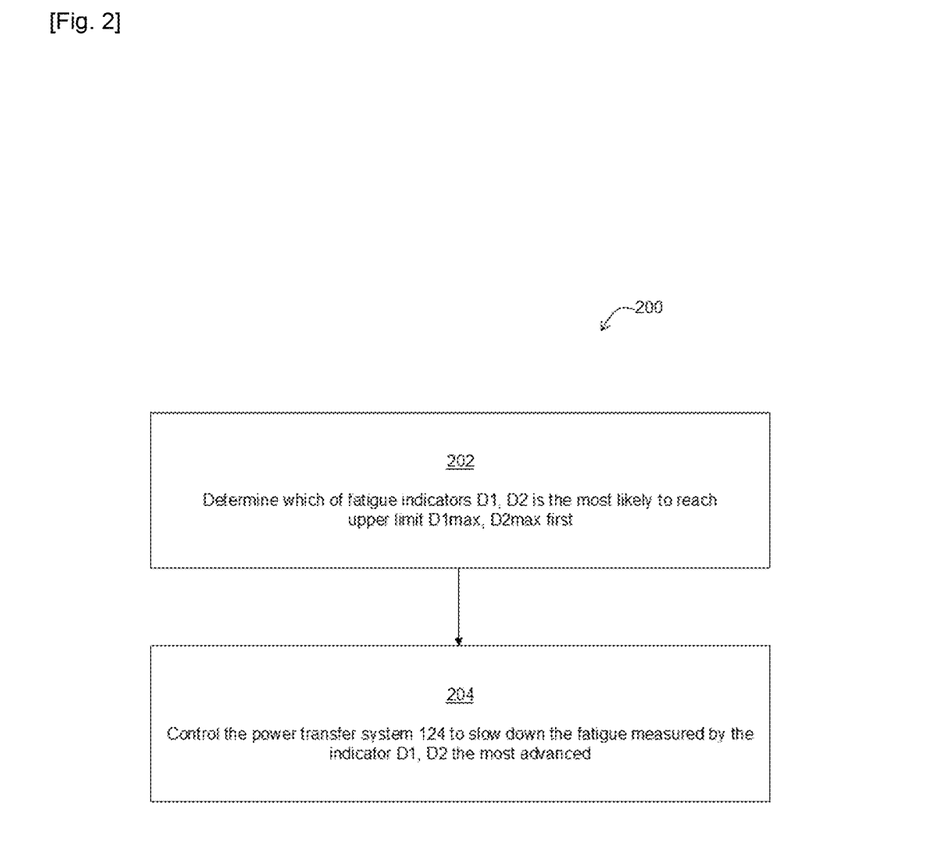
FIG. 2 is a block diagram illustrating the steps in a first method for controlling a power transfer system for the turbomachine in FIG. 1, in order to postpone the next maintenance operation on the turbomachine, FIG. 3 groups together chronograms illustrating the evolution, during an observation period, of a speed of rotation of a high-pressure shaft and of a temperature of gas at the outlet of a high-pressure turbine of the turbomachine of FIG. 1, in a first scenario of implementation of the method of FIG. 2, FIG. 4 groups together chronograms illustrating the evolution, after the observation period, of the speed of rotation of the high-pressure shaft, of the temperature of the gases leaving the high-pressure turbine, and a transfer of power between the high-pressure shaft and a low-pressure shaft, in the first scenario of implementation of the method in FIG. 2.

Thus, with reference to FIG. 2, an example of a method 200 according to the invention for controlling the power transfer system 124, when the control device 136 is in the MAX SERVICE LIFE mode, will now be described.

This control of the power transfer system 124 is preferably carried out at "iso output power (net power)", i.e., while the control module 138 for controlling the turbomachine 104 regulates the speed of the output shaft 118 independently of the control of the power transfer system 124.

During a step 202, the fatigue analysis module 142 determines which of the indicators D1, D2 is the most in advance, i.e., is likely to reach its respective upper limit D1max, D2max first.

For example, the fatigue analysis module 142 first obtains an evolution in the low cycle fatigue indicator D1 from the counter 132 and an evolution in the creep fatigue indicator D2 from the counter 134, during a period of observation of the operation of the turbomachine 104. For example, the observation period extends from the last maintenance operation carried out to the present time. Alternatively, the observation period corresponds to a stationary period of time in the past up to the present moment. For example, the observation period has a predefined minimum duration, i.e. the control device 136 only moves on to the next steps when the evolutions in the indicators D1, D2 are known for at least this minimum duration. In this way, the control device 136 can acquire sufficient data for the analysis that will be described later to be relevant.

The fatigue analysis module 142 then analyses the past evolutions to determine which of the indicators D1 and D2 is more advanced.

In a simple example of analysis, the fatigue analysis module 142 can, for example, make a linear prediction by considering that the indicator D1, D2 will increase in the future at a constant rate equal to the average rate of increase over the observation period.

In a step 204, the control module 140 controlling the power transfer system 124 controls the latter to transfer power between the high-pressure shaft 108 and the low-pressure shaft 116, to slow down the fatigue measured by the indicator D1, D2 the most advanced.

For example, the power transferred is fixed at a predefined value, depending on measured parameters such as an outside temperature T0 and/or an outside pressure P0 and/or a turbine regime (for example, take-off regime or cruising regime). Preferably, the predefined value is the optimum value for the parameters under consideration, i.e. that for which the rate of increase of the indicator D1, D2 the most advanced is the smallest. For example, the control device 136 comprises a table associating the power value to be transferred for each set of parameter values.

For example, if the indicator D1 is more advanced, the control module 140 controlling the power transfer system 124 controls the latter to reduce the amplitude of the variations in the rotational speed NHP, thereby slowing down the low cycle fatigue. "Slowing low cycle fatigue" means that the rate of increase in low cycle fatigue (and therefore in the indicator D1) is lower with the transfer of power than without this power transfer, all other things being equal. To do this, the power transfer system 124 is, for example, controlled to carry out one or both of the following actions: reducing the speed of rotation NHP when it becomes too high, and increasing the speed of rotation NHP when it becomes too low.

For example, to reduce the rotation speed NHP when it becomes too high, the control module 140 controlling the power transfer system 124 compares the rotation speed NHP with a predefined threshold NHPh. When the rotation speed NHP rises above this threshold NHPh, the control module 140 controlling the power transfer system 124 controls the latter to transfer power from the high-pressure shaft 108 towards the low-pressure shaft 116. The threshold NHPh is, for example, between 90% and 100% (for example 95%) of a nominal speed of rotation of between 40,000 and 55,000 revolutions per minute for a turboshaft engine, and between 15,000 and 30,000 revolutions per minute for a turbojet engine. The nominal speed of rotation is, for example, by convention the speed obtained at maximum authorised power under standard environmental conditions.

For example, to stop transferring power, the control module 140 controlling the power transfer system 124 compares the rotational speed NHP with a predefined threshold NHPh' (lower than the threshold NHPh) and controls the power transfer system 124 to stop transferring power when the rotational speed NHP falls below the threshold NHPh'. Alternatively, the power transfer can be stopped by the module 140 when the indicator D2 returns to the most advanced indicator or when the MAX SERVICE LIFE mode is exited.

On the other hand, in order to increase the speed of rotation NHP when it becomes too low, the control module 140 controlling the power transfer system 124 compares, for example, the speed of rotation NHP with a threshold NHPb (lower than the threshold NHPh) and, when it falls below the threshold NHPb, controls the power transfer system 124 to transfer power from the low-pressure shaft 116 towards the high-pressure shaft 108. The threshold NHPb is, for example, between 80% and 90% (for example 85%) of the nominal rotation speed NHPn.

For example, to stop transferring power, the control module 140 controlling the power transfer system 124 compares the rotational speed NHP with a predefined threshold NHPb' (above the threshold NHPb and below the threshold NHPh') and controls the power transfer system 124 to stop transferring power when the rotational speed NHP rises above the threshold NHPb'. Alternatively, the power transfer can be stopped by the module 140 when the indicator D2 returns to the most advanced indicator or when the MAX SERVICE LIFE mode is exited.

Again by way of example, if the indicator D2 is more advanced, the control module 140 controlling the power transfer system 124 controls the latter to limit the output temperature T45, which slows down the creep fatigue. "Slowing creep fatigue" means that the rate of increase in creep fatigue (and therefore in the indicator D2) is lower with the power transfer than without it, all other things being equal.

To do this, the control module 140 controlling the power transfer system 124 compares, for example, the output temperature T45 with a threshold T45$h$ and, when it rises above the threshold T45$h$, controls the power transfer system 124 to transfer power from the low pressure shaft 116 towards the high pressure shaft 108.

For example, to stop transferring power, the control module 140 controlling the power transfer system 124 compares the output temperature T45 with a predefined threshold T45$h$' (greater than the threshold T45$h$) and controls the power transfer system 124, for example, to stop transferring power when the output temperature T45 rises above the threshold T45$h$'. Alternatively, the power transfer can be stopped by the module 140 when the indicator D1 returns to the most advanced indicator or when the MAX SERVICE LIFE mode is exited.

Two examples of implementation of the method 200 can be used will now be described. The figures used for these examples are fictitious and arbitrary, and given for illustration purposes only.

Figure 3:
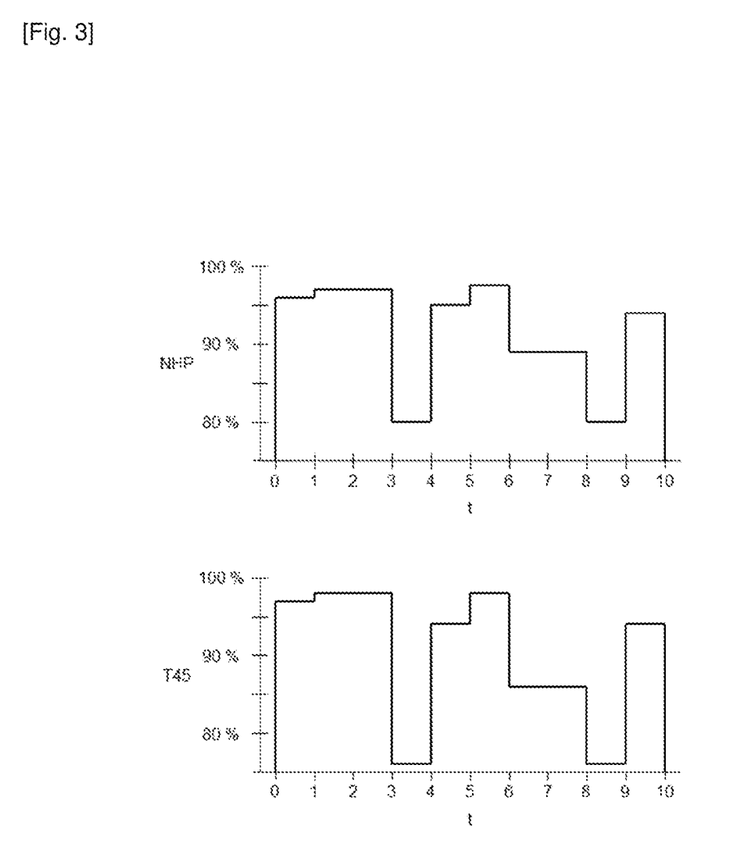
Figure 4:
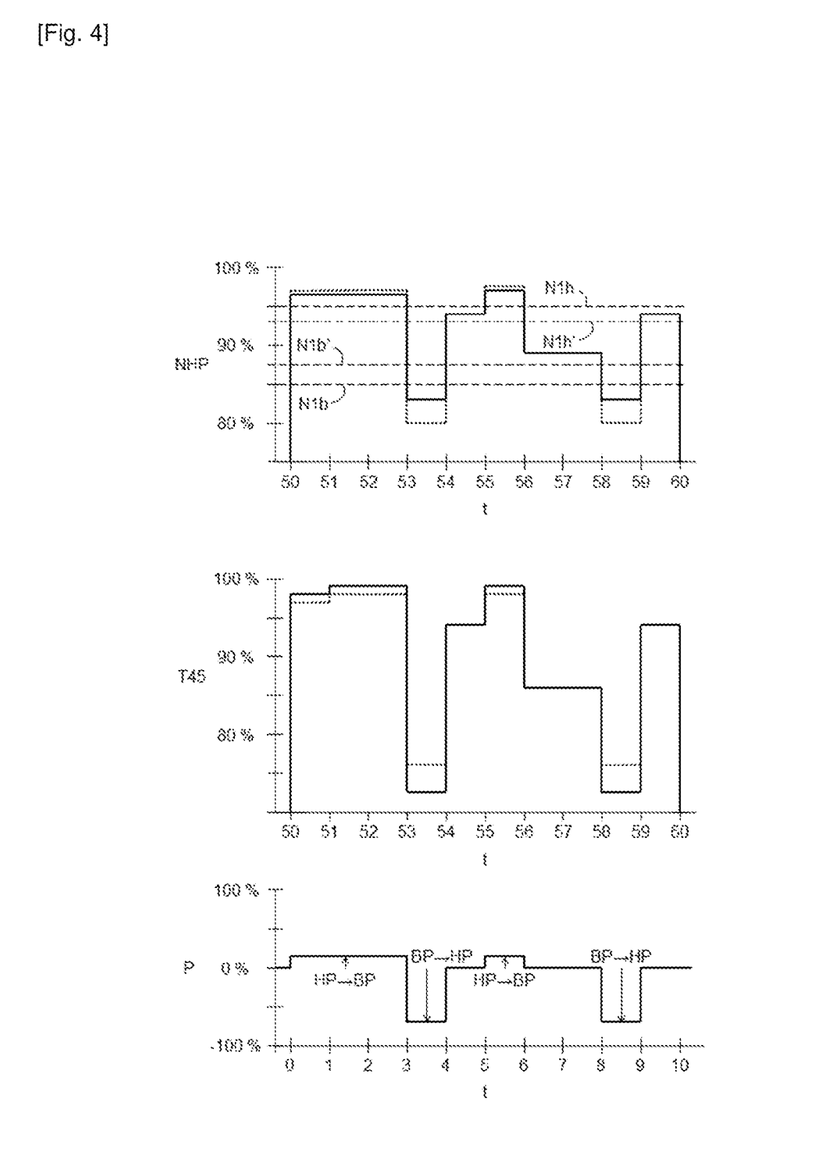

With reference to FIGS. 3 and 4, a first example of implementation of the method 200 will now be described.

In this first example, the aircraft 102 is assumed to carry out the same 10-minute winching mission in a loop. The variations in the rotation speed NHP and in the output temperature T45 during the winching mission are illustrated in FIG. 3. The indicators D1, D2 are also assumed to be zero at the start of the first mission and the observation period is assumed to be 50 minutes (i.e., five winching missions). Finally, the thresholds D1max and D2max are assumed to be 1,000 and 2,000 respectively.

As can be seen in FIG. 3, the winching mission involves a great variation in the rotation speed NHP and in the output temperature T45.

Thus, in the example described, the indicator D1 increases by 2 with each winching mission (10 minutes), i.e., an increase AD1 of 10 over the duration of the observation period I (50 minutes), while the indicator D2 increases by 3 with each winching mission (10 minutes), i.e., an increase AD2 of 15 over the duration of the observation period I (50 minutes).

Now, implementing a linear estimate, the fatigue analysis module 142 predicts that the threshold D1max will be reached at the 5000th minute of operation of the turbomachine 104: (D1max/ΔD1)×I=(1,000/10)×50=5,000, or 4,950 minutes later. The fatigue analysis module 142 also predicts that the D2max threshold will be reached at the 6667th minute of operation of the turbomachine 104: (D2max/AD2)×I=(2,000/15)×50=6,667, or 6,617 minutes later.

So, in this example, the fatigue analysis module 142 determines that it is the indicator D1 that is the most advanced.

With reference to FIG. 4, the control module of the power transfer system 124 then controls the latter as described above. In particular, power is transferred from the high-pressure shaft 108 to the low-pressure shaft 116, to decrease the rotational speed NHP when the latter is high, and power is transferred from the low-pressure shaft 116 towards the high-pressure shaft 108 to increase the rotational speed NHP when the latter is low. As a result, the amplitude of the cycles of the rotation speed NHP is reduced, which means that low cycle fatigue is slowed down.

In the example described, the amounts of power transferred shown in FIG. 4 mean that the indicator D1 increases by 1.6 per winching mission (10 minutes), instead of 2 previously, and that the indicator D2 increases by 3.1 per winching mission (10 minutes), instead of 3 previously. Thus, assuming that the future operation of the turbojet 104 remains identical to the past operation, the indicator D1 will reach its threshold D1max after 6,125 minutes and the indicator D2 will reach its threshold D2max after 6,400 minutes. So, in this example, the indicator D1 is still the limiting indicator, but the situation is improved because the frequency of the maintenance operation is postponed by 1,175 minutes.

Figure 5:
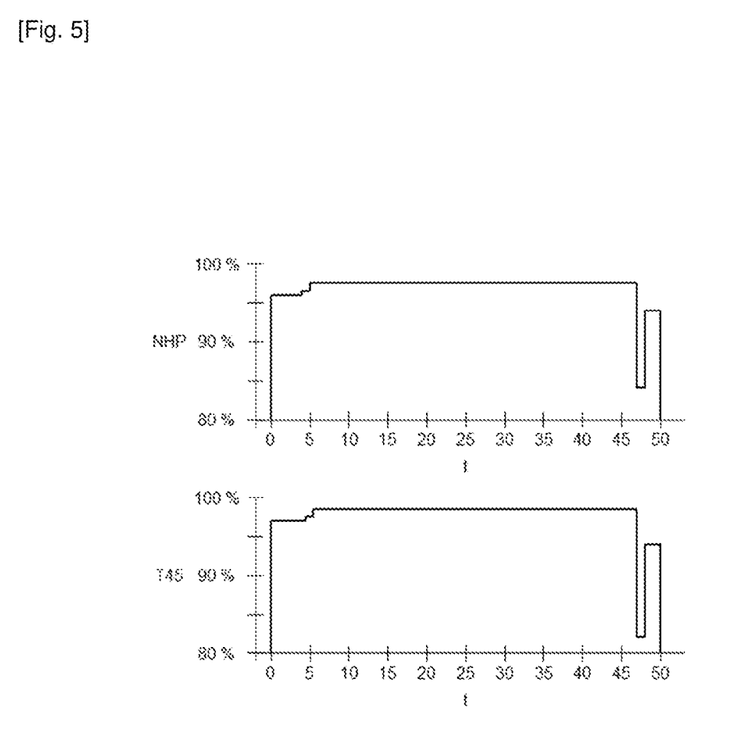
FIG. 5 is similar to FIG. 3, for a second scenario implementing the method shown in FIG. 2.
Figure 6:
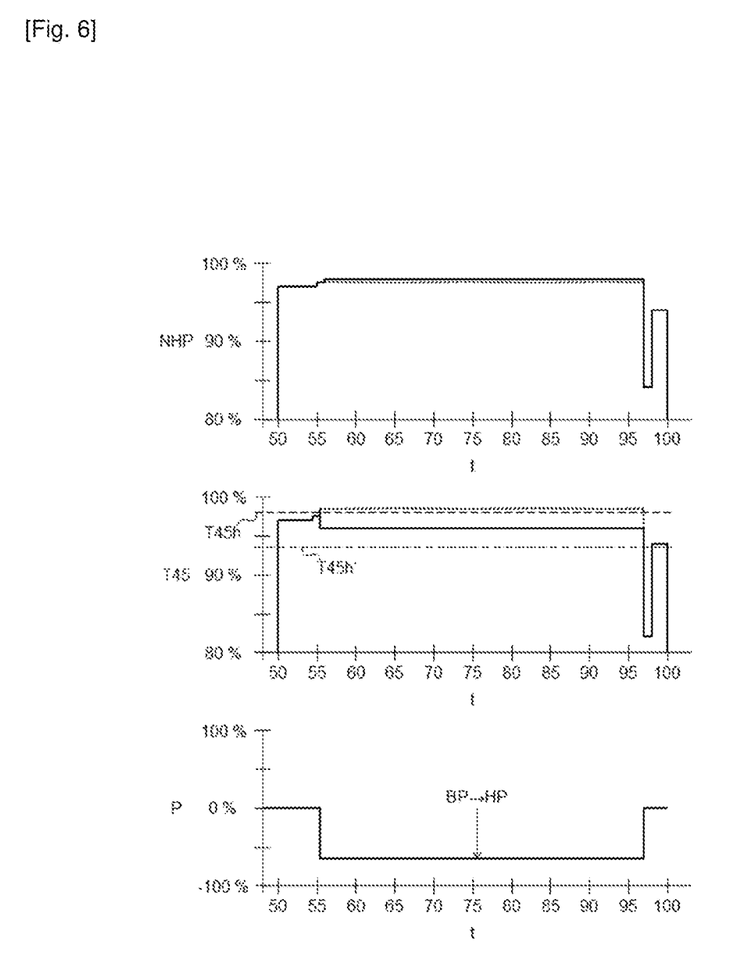
FIG. 6 is similar to FIG. 4, for the second scenario for implementing the method in FIG. 2.

With reference to FIGS. 5 and 6, a second example of implementation of the method 200 will now be described.

In this second example, the aircraft 102 is assumed to carry out the same 50-minute transport mission, for example passenger transport, in a loop. The variations in the rotation speed NHP and in the output temperature T45 during the transport mission are illustrated in FIG. 5. The indicators D1, D2 are also assumed to be zero at the start of the first transport mission and the observation period is assumed to be 50 minutes (i.e. one transport mission). Finally, the thresholds D1max and D2max are assumed to be 1,000 and 2,000 respectively.

As can be seen in FIG. 5, the transport mission causes little variation in the rotational speed NHP and in the output temperature T45, but they both remain at a very high value for most of the time.

So, in the example described, the indicator D1 increases by 2 for each transport mission, and therefore over the duration of observation period I (50 minutes), while the indicator D2 increases by 20 for each transport mission, and therefore over the duration of observation period I (50 minutes).

Implementing a linear estimation, the control device 136 predicts that the threshold D1max will be reached at the 25,000th minute of operation of the turbomachine 104: (D1max/AD1)×I=(1,000/2)×50=25,000, i.e. after 24,950 minutes. The control device 136 also predicts that the threshold D2max will be reached at the 5000th minute of operation of the turbomachine 104: (D2max/AD2)×I=(2,000/20)×50=5,000, or 4,950 minutes later.

So, in this example, the control device 136 determines that it is the indicator D2 that is the most advanced.

Referring to FIG. 6, the control device 136 then controls the power transfer system 124 as described above. In particular, power is transferred from the low-pressure shaft 116 towards the high-pressure shaft 108 to reduce the output temperature T45 when the latter is high (when it rises above the threshold T45h). This limits the outlet temperature T45, which slows down the creep fatigue.

In the example described, with the transfer of power, the indicator D2 increases by 15 per 50-minute mission (instead of 20 previously). The power transferred involving no noticeable change in the cycles of the rotation speed, so the increase in the indicator D1 remains substantially unchanged, with an increase in D1 of 2 per transport mission (50 minutes).

Thus, assuming that the future operation of the turbomachine 104 remains identical to the past operation, the indicator D2 will reach its threshold D2max after 6,600 minutes. In this example, the indicator D2 is still the limiting indicator, but the situation is improved because the frequency of the maintenance operation is postponed by 1,650 minutes.

The two examples described above are extreme, so that one indicator largely takes precedence over the other. However, in these extreme cases, the design of the turbomachine 104 does not allow the rate of increase in the most advanced indicator to be reduced as much as desired.

However, in practice, the aircraft 102 carries out a combination of highly cyclic missions (winching type) and constant high speed missions (transport type). The method 200 is thus repeated over time, so that when the progress of one indicator is limited by the implementation of the method 200 to the detriment of the other indicator, and this other indicator becomes limiting (i.e. the most advanced), the next iteration of the method 200 will detect it and try to limit it in turn. In this way, the thresholds D1max and D2max are reached more or less simultaneously.

MAX POWER Mode

In this mode, the objective is to allow the output power (net power) of the turbomachine 104 to be greater than the maximum power Pn, without substantially modifying the actual service life of the turbomachine 104, i.e. without this increase in output power (net power) being accompanied by an increase in the next maintenance operation on the turbomachine 104.

This mode can be inhibited when the input torque limit of the main gearbox (MGB) is reached and/or when the external pressure P0 and/or the outer temperature T0 do not allow more net power seen by the helicopter rotor to be recovered by injecting power into the HP body.

Figure 7:
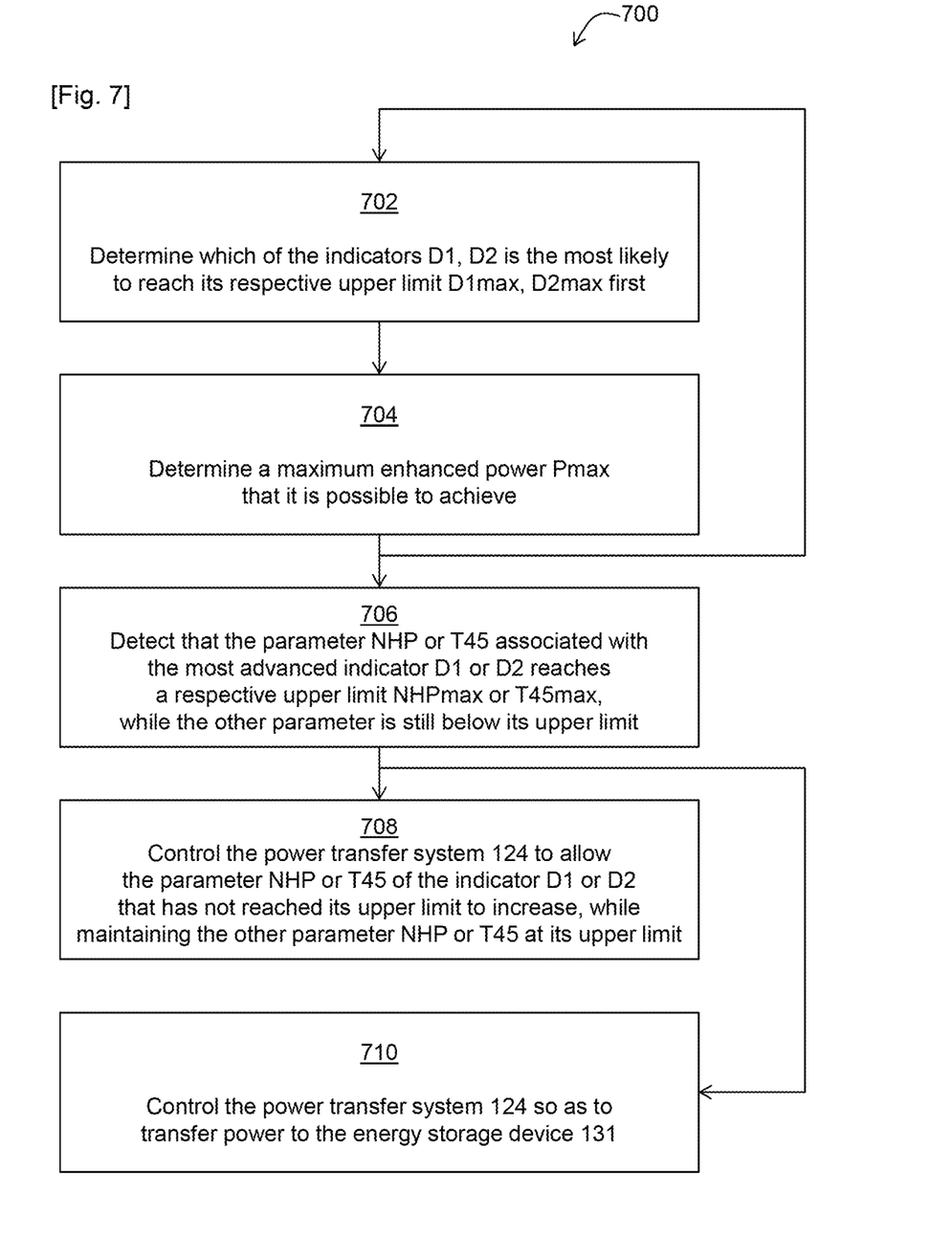
FIG. 7 is a block diagram illustrating steps in a second method for controlling a power transfer system of the turbomachine of FIG. 1, to increase an output power provided by the turbomachine, and FIG. 8 groups together chronograms illustrating the evolution in the speed of rotation of the high-pressure shaft, of the temperature of the gases leaving the high-pressure turbine, and of a transfer of power between the high-pressure shaft and the low-pressure shaft, in a scenario for implementing the method shown in FIG. 7.

With reference to FIG. 7, an example of method 700 according to the invention for controlling the power transfer system 124, when the control device 136 is in "MAX POWER" mode, will now be described.

During a step 702, the fatigue analysis module 142 determines which of the indicators D1, D2 is in the most advanced, i.e. is likely to reach its respective upper limit D1max, D2max first. This determination is carried out, for example, as described above in step 202 of the method 200.

In a step 704, the operating analysis module 144 determines a maximum enhanced power Pmax that it is possible to achieve, taking into account the possibility of transferring power between the high-pressure shaft 108 and the low-pressure shaft 116 according to the indicator D1 or D2 which is most advanced. The operating analysis module 144 then displays this enhanced maximum power Pmax in the man/machine interface 154, for example, instead of the maximum power Pn of the turbomachine 104. Alternatively or additionally, the man/machine interface 154 updates the remaining power margin, in relation to the enhanced maximum power Pmax instead of the maximum power Pn. This margin is displayed as a percentage, for example. For example, if the maximum power Pn is 500 kW, and if the increased maximum power Pmax is 520 kW while the power currently provided is 480 kW, the margin displayed increases from 4% (1-480/500) to 7.7% (1-480/520%) when the MAX POWER mode is selected.

The steps 702 and 704 can be repeated over time, in order to update the display of the man/machine interface 154.

As explained above, the indicator D1 is calculated from the rotation speed NHP and the indicator D2 is calculated (mainly) from the indicator T45. Thus, if the indicator D1 is more advanced, it is this indicator that defines the actual service life of the turbomachine 104 and it is not desirable to increase the rotation speed NHP, so as not to impact this actual service life. Similarly, if the indicator D2 is more advanced, it is this indicator that defines the actual service life of the turbomachine 104 and it is not desirable to increase the output temperature T45, so as not to impact this actual service life.

In a step 706, the operation analysis module 144 detects that the parameter NHP or T45 associated with the most advanced indicator D1 or D2 reaches a respective upper limit NHPmax or T45max, while the other parameter is still below its upper limit. In the example described, these upper limits NHPmax, T45max correspond to the nominal values NHPn, T45n.

In particular, if the indicator D1 is more advanced, the operating analysis module 144 detects when the rotation speed NHP reaches its upper limit NHPmax. If the indicator D2 is more advanced, the operating analysis module 144 detects when the output temperature T45 reaches its upper limit T45max.

In response to this detection, during a step 708, the control module 140 controlling the power transfer system 124 controls the latter to allow the parameter NHP or T45 of the indicator D1 or D2 that has not reached its upper limit to increase, while maintaining the other parameter NHP or T45 at its upper limit, in order to increase the output power (net power) of the turbomachine 104, in particular above the maximum power Pn.

In particular, if the indicator D1 is more advanced and the rotational speed NHP is at its upper limit NHPmax, the control module 140 controlling the power transfer system 124 controls the latter to transfer power from the high-pressure shaft 108 towards the low-pressure shaft 116. This power transfer tends to lower the rotation speed NHP, which provides a margin of output power (net power) so as to maintain the rotation speed NHP at its upper limit NHPmax. In this way, the rate of increase in low cycle fatigue remains substantially unchanged, so that the rate of increase in the indicator D1 remains substantially unchanged. On the other hand, this transfer of power increases the output temperature T45 because the reduction in the rotational speed NHP increases the combustion richness at iso output power (net power), so that creep fatigue accelerates, which in turn accelerates the progression of the indicator D2 which measures it. However, this has no impact on the actual service life of the turbomachine 104, as it is the indicator D1 that is more advanced and therefore defines this actual service life.

Similarly, if the indicator D2 is more advanced and the output temperature T45 is at its upper limit T45max, the control module 140 controlling the power transfer system 124 controls the latter to transfer power from the low pressure shaft 116 towards the high pressure shaft 108. This power transfer tends to lower the output temperature T45, which gives the control module 138 controlling the turbomachine 104 margin to increase the power of the output shaft 118. This increase in power therefore maintains the output temperature T45 at its upper limit T45max. As a result, the rate of creep fatigue increase remains virtually unchanged. In return for this transfer of power, the rotation speed NHP increases, so that low cycle fatigue accelerates, which in turn accelerates the progress of the indicator D1 that measures it. However, this has no impact on the actual service life of the turbomachine, as it is the indicator D2 that is more advanced and therefore defines this actual service life.

Optionally, during a step 710, if the turbomachine 104 has a power margin, i.e. the output power (net power) of the turbomachine 104 is less than the maximum boosted power Pmax, the control module 142 controlling the power transfer system 124 controls the latter so as to transfer power to the energy storage device 131 from the high-pressure shaft 108 (case where the indicator D1 is more advanced and the rotation speed NHP is at its upper limit NHPmax) or from the low-pressure shaft 116 (case where the indicator D2 is more advanced and the output temperature T45 is at its upper limit T45max).

Figure 8:
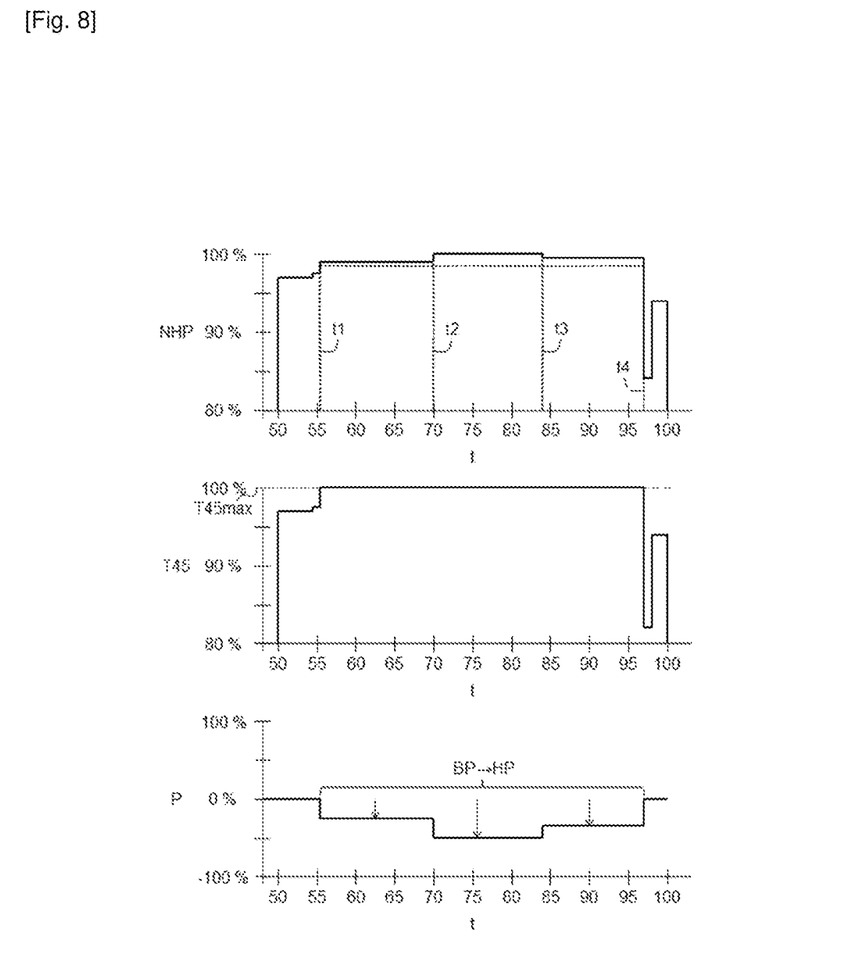

With reference to FIG. 8, a second example of implementation of the method 700 will now be described.

In this second example, the indicator D2 is assumed to be determined in advance.

At time t1, it is detected that the output temperature T45 has reached its upper limit T45max, assumed to correspond to the nominal output temperature, so that the output power (net power) is equal to the maximum power Pn.

However, the output shaft speed decreases, indicating that more power is required.

In this way, the power transfer system 124 transfers power from the low-pressure shaft 116 towards the high-pressure shaft 108. This increases the output power (net power). This increase in the output power (net power) is achieved by maintaining the temperature T45 at its upper limit T45max and increasing the speed of rotation NHP.

As can be seen in FIG. 8, the power transferred can vary over time (instants t2 and t3) as required to keep the output shaft speed 118 constant.

At time t4, the power required to keep the output shaft speed 118 constant decreases, so that the output temperature T45 decreases and moves away from its upper limit T45max. The power transfer is therefore stopped.

The horizontal dotted line illustrates what the rotation speed NHP would be in the absence of power transfer.

AUTO Mode

In this mode, the control device 136 implements the MAX SERVICE TIME mode strategy when none of the parameters NHP, T45 has reached its upper limit NHPmax, T45max, and the MAX POWER mode strategy as soon as one of the parameters NHP, T45 reaches its upper limit NHPmax, T45max.

It will be further noted that the invention is not limited to the embodiments described above. Indeed, it will be apparent to the person skilled in the art that various modifications can be made to the above-described embodiments, in the light of the teaching just disclosed.

In the detailed presentation of the invention given above, the terms used should not be interpreted as limiting the invention to the embodiments set out in the present description, but should be interpreted to include all equivalents the anticipation of which is within the reach of the person skilled in the art by applying his general knowledge to the implementation of the teaching just disclosed.

The invention claimed is:

1. A control device for controlling a power transfer system for the transfer of power between a high-pressure shaft and a low-pressure shaft of a turbomachine of an aircraft, wherein the control device comprises:
 a fatigue analysis module for analysing the fatigue of the turbomachine designed to determine from between two indicators (D1, D2) respectively measuring two fatigues of the turbomachine, which is the one that is the most in advance, i.e., is likely to reach a respective upper limit (D1max, D2max) first; and
 a control module for controlling the power transfer system designed to slow down the fatigue measured by the most advanced indicator (D1, D2).

2. The control device according to claim 1, wherein one of the two fatigues is a low cycle fatigue of a high pressure compressor mounted on the high pressure shaft and/or of a high pressure turbine mounted on the high pressure shaft.

3. The control device as claimed in claim 2, wherein the low cycle fatigue indicator (D1) is calculated from a rotational speed (NHP) of the high pressure shaft.

4. The control device according to claim 1, wherein one of the two fatigues is creep fatigue of vanes of a high pressure turbine mounted on the high pressure shaft.

5. The control device according to claim 4, wherein the creep fatigue indicator (D2) is calculated from an outlet gas temperature (T45) at the outlet of the high pressure turbine.

6. The control device according to claim 1, further comprising a regulation module for regulating an output power of the turbomachine, independently of the control of the power transfer system.

7. The control device according to claim 1, further comprising the two indicators (D1, D2) increasing with respectively two operating parameters (NHP, T45) of the turbomachine:
 an operating analysis module for analysing the operation of the turbomachine designed to detect when an operating upper limit (NHPmax, T45max) is reached by the parameter (NHP, T45) associated with the most advanced indicator (D1, D2);
 and wherein the control module for controlling the power transfer system is further designed, in response to the detection of the operating upper limit reached (NHPmax, T45max), to control the power transfer system by maintaining at this operating upper limit the parameter (NHP, T45) associated with the most advanced indicator (D1, D2) while allowing the other parameter (NHP, T45) to increase, so as to increase an output power margin of the turbomachine.

8. The control device according to claim 2, further comprising the two indicators (D1, D2) increasing with respectively two operating parameters (NHP, T45) of the turbomachine:
 an operating analysis module for analysing the operation of the turbomachine designed to detect when an operating upper limit (NHPmax, T45max) is reached by the parameter (NHP, T45) associated with the most advanced indicator (D1, D2);
 and wherein the control module for controlling the power transfer system is further designed, in response to the detection of the operating upper limit reached (NHPmax, T45max), to control the power transfer system by maintaining at this operating upper limit the parameter (NHP, T45) associated with the most advanced indicator (D1, D2) while allowing the other parameter (NHP, T45) to increase, so as to increase an output power margin of the turbomachine, wherein the parameter (NHP) on which the low cycle fatigue indicator (D1) depends is a rotational speed (NHP) of the high pressure shaft.

9. The control device according to claim 4, further comprising the two indicators (D1, D2) increasing with respectively two operating parameters (NHP, T45) of the turbomachine:
an operating analysis module for analysing the operation of the turbomachine designed to detect when an operating upper limit (NHPmax, T45max) is reached by the parameter (NHP, T45) associated with the most advanced indicator (D1, D2);
and wherein the control module for controlling the power transfer system is further designed, in response to the detection of the operating upper limit reached (NHPmax, T45max), to control the power transfer system by maintaining at this operating upper limit the parameter (NHP, T45) associated with the most advanced indicator (D1, D2) while allowing the other parameter (NHP, T45) to increase, so as to increase an output power margin of the turbomachine wherein the parameter (T45) on which the creep fatigue indicator (D2) depends is a gas outlet temperature (T45) at the outlet of the high-pressure turbine.

10. A propulsion system for an aircraft, wherein the propulsion system comprises:
a turbomachine comprising:
a high-pressure shaft,
a high-pressure compressor mounted on the high-pressure shaft,
a high-pressure turbine mounted on the high-pressure shaft and designed to be passed through by gases,
a low-pressure shaft, and
a low-pressure turbine mounted on the low-pressure shaft and designed to be passed through by the gases which have passed through the high-pressure turbine;
a power transfer system for transferring power between the high-pressure shaft and the low-pressure shaft; and
the control device for controlling the power transfer system according to claim 1.

11. An aircraft comprising a propulsion system according to claim 10.

12. A method for controlling a power transfer system for transferring the power between a high-pressure shaft and a low-pressure shaft of a turbomachine of an aircraft, wherein the method comprises:
determining which of two indicators (D1, D2) measuring respectively two different fatigues of the turbomachine is the most in advance, i.e. is likely to reach a respective upper limit (D1max, D2max) first; and
controlling the power transfer system to slow down the fatigue measured by the most advanced indicator (D1, D2).

13. The method according to claim 12, wherein the control for controlling the power transfer system to slow down the fatigue measured by the most advanced indicator is carried out in a first mode, the method further comprising switching to a second mode comprising:
the two indicators (D1, D2) increasing with respectively two operating parameters (NHP, T45) of the turbomachine, the detection that the parameter (NHP, T45) associated with the most advanced indicator (D1, D2) first reaches a respective upper limit (NHPmax, T45max); and
in response to the detection, controlling (708) the power transfer system so as to maintain the parameter (NHP, T45) of the most advanced indicator (D1, D2) at its upper limit (NHP, T45) and to increase the other parameter (NHP, T45), so as to increase a power output margin of the turbomachine.

14. A non-transitory computer readable medium storing a computer program comprising instructions for executing the steps of a method according to claim 12, when said computer program is executed on a computer.

* * * * *